United States Patent
Pan et al.

(10) Patent No.: US 10,921,699 B2
(45) Date of Patent: Feb. 16, 2021

(54) OPTICAL ROTATING DEVICE, ILLUMINATION SYSTEM AND PROJECTION DEVICE

(71) Applicant: Coretronic Corporation, Hsin-Chu (TW)

(72) Inventors: Haw-Woei Pan, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/876,129

(22) Filed: May 18, 2020

(65) Prior Publication Data
US 2020/0371413 A1 Nov. 26, 2020

(30) Foreign Application Priority Data
May 22, 2019 (CN) .......................... 2019 1 0427733

(51) Int. Cl.
G03B 21/20 (2006.01)
H04N 9/31 (2006.01)

(52) U.S. Cl.
CPC ......... *G03B 21/204* (2013.01); *G03B 21/208* (2013.01); *G03B 21/2013* (2013.01); *G03B 21/2066* (2013.01); *G03B 21/2073* (2013.01); *H04N 9/3167* (2013.01)

(58) Field of Classification Search
CPC .............. G03B 21/204; G03B 21/2013; G03B 21/2033; G03B 21/2073; H04N 9/3167; H04N 9/3164; H04N 9/3161; H04N 9/3158
See application file for complete search history.

(56) References Cited

U.S. PATENT DOCUMENTS

2017/0059975 A1* 3/2017 Aizaki ................... G03B 33/12

FOREIGN PATENT DOCUMENTS

| CN | 102155639 | 5/2014 |
| CN | 106796387 | 5/2017 |
| TW | 1597556 | 9/2017 |

* cited by examiner

*Primary Examiner* — Ryan D Howard
(74) *Attorney, Agent, or Firm* — JCIPRNET (57) ABSTRACT

An optical rotating device includes a substrate having a first surface and a second surface opposite to each other, a rotating shaft connected to the substrate, a driving element connected to the rotating shaft and driving it to rotate, a wavelength conversion layer disposed on the first surface to convert a first laser beam into a converted beam, and a polarizing element disposed on the second surface. The first laser beam and at least one second laser beam are respectively transmitted to the wavelength conversion layer and the polarizing element from opposite directions. The driving element drives the substrate, the wavelength conversion layer and the polarizing element to rotate along the rotating shaft as a rotation central axis. When the polarizing element is rotated, the polarizing element makes the second laser beam have different polarization states at different times. An illumination system and a projection device are also provided.

20 Claims, 11 Drawing Sheets

OPTICAL ROTATING DEVICE, ILLUMINATION SYSTEM AND PROJECTION DEVICE

CROSS-REFERENCE TO RELATED APPLICATION

This application claims the priority benefit of China application serial no. 201910427733.6, filed on May 22, 2019. The entirety of the above-mentioned patent application is hereby incorporated by reference herein and made a part of this specification.

BACKGROUND

Technical Field

The invention relates to an optical rotating device, an illumination system and a projection device.

Description of Related Art

Projection device is a display device used for generating large-scale images, and has been continuously improved along with development and innovation of science and technology. An imaging principle of the projection device is to use a light valve to convert an illumination beam generated by an illumination system into an image beam, and then project the image beam to a projection target (for example, a screen or a wall surface) through a projection lens to form a projection image.

Besides that a laser projection device may use a laser light generated from a laser light source to excite phosphor powder to emit a converted light, it may also directly use laser diodes as a projector illumination light source, which has an advantage of adjusting the number of light sources according to a brightness requirement, so as to achieve projector requirements of various brightnesses.

However, in a known illumination system framework, a polarization polarity of a laser beam from the laser light source will be spoiled by optical elements inside the projection device, resulting in scattering of a polarization direction and intensity of the laser light, and causing a problem of uneven brightness of a displayed image. Therefore, if a three-dimensional (3D) image is displayed in a polarized stereoscopic mode (a projection lens with a polarizer disposed outside the projection lens), the image projected from the projection lens with the polarizer may have a phenomenon of uneven image color or uneven brightness.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an optical rotating device, an illumination system and a projection device, and when the projection device is in a polarized stereoscopic mode, a color or brightness of a display image is uniform, and a user may observe a stereoscopic display image with better uniformity.

Other objects and advantages of the invention may be further illustrated by the technical features broadly embodied and described as follows.

In order to achieve one or a portion of or all of the objects or other objects, an embodiment of the invention provides an optical rotating device including a substrate, a rotating shaft, a driving element, a wavelength conversion layer and a polarizing element. The substrate has a first surface and a second surface opposite to each other. The rotating shaft is connected to the substrate. The driving element is connected to the rotating shaft, and is configured to drive the rotating shaft to rotate. The wavelength conversion layer is disposed on the first surface of the substrate, and is disposed on a transmission path of a first laser beam to convert the first laser beam into a converted beam. The polarizing element is disposed on the second surface of the substrate, and is disposed on a transmission path of at least one second laser beam, wherein the first laser beam and the at least one second laser beam are respectively transmitted to the wavelength conversion layer and the polarizing element from opposite directions, the driving element is configured to drive the substrate, the wavelength conversion layer and the polarizing element to rotate along the rotating shaft serving as a rotation central axis, and when the polarizing element is rotated, the at least one second laser beam is incident on the polarizing element, and the at least one second laser beam outputted from the polarizing element has different polarization states at different times.

In order to achieve one or a portion of or all of the objects or other objects, an embodiment of the invention provides an illumination system configured to provide an illumination beam. The illumination system includes a first laser light source unit, a second laser light source unit and the aforementioned optical rotating device. The first laser light source unit is configured to emit a first laser beam. The second laser light source unit is configured to emit at least one second laser beam. The optical rotating device is disposed on transmission paths of the first laser beam and the at least one second laser beam. The illumination beam includes a converted beam and the at least one second laser beam.

In order to achieve one or a portion of or all of the objects or other objects, an embodiment of the invention provides a projection device including the aforementioned illumination system, at least one light valve and a projection lens. The at least one light valve is disposed on a transmission path of the illumination beam to convert the illumination beam into an image beam. The projection lens is disposed on a transmission path of the image beam.

Based on the above description, the embodiments of the invention have at least one of following advantages or effects. In the optical rotating device or the illumination system or the projection device equipped with the optical rotating device of the invention, the driving element is configured to drive the substrate, the wavelength conversion layer and the polarizing element to rotate along the rotating shaft serving as the rotation central axis. Therefore, the at least one second laser beam outputted from the polarizing element has different polarization states at different times. In this way, when the projection device is in a polarized stereoscopic mode (the projection lens with a polarizer disposed outside the projection lens), the color or brightness of the display image is even, so that the user may observe the stereoscopic display image with better uniformity through polarized stereoscopic glasses.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
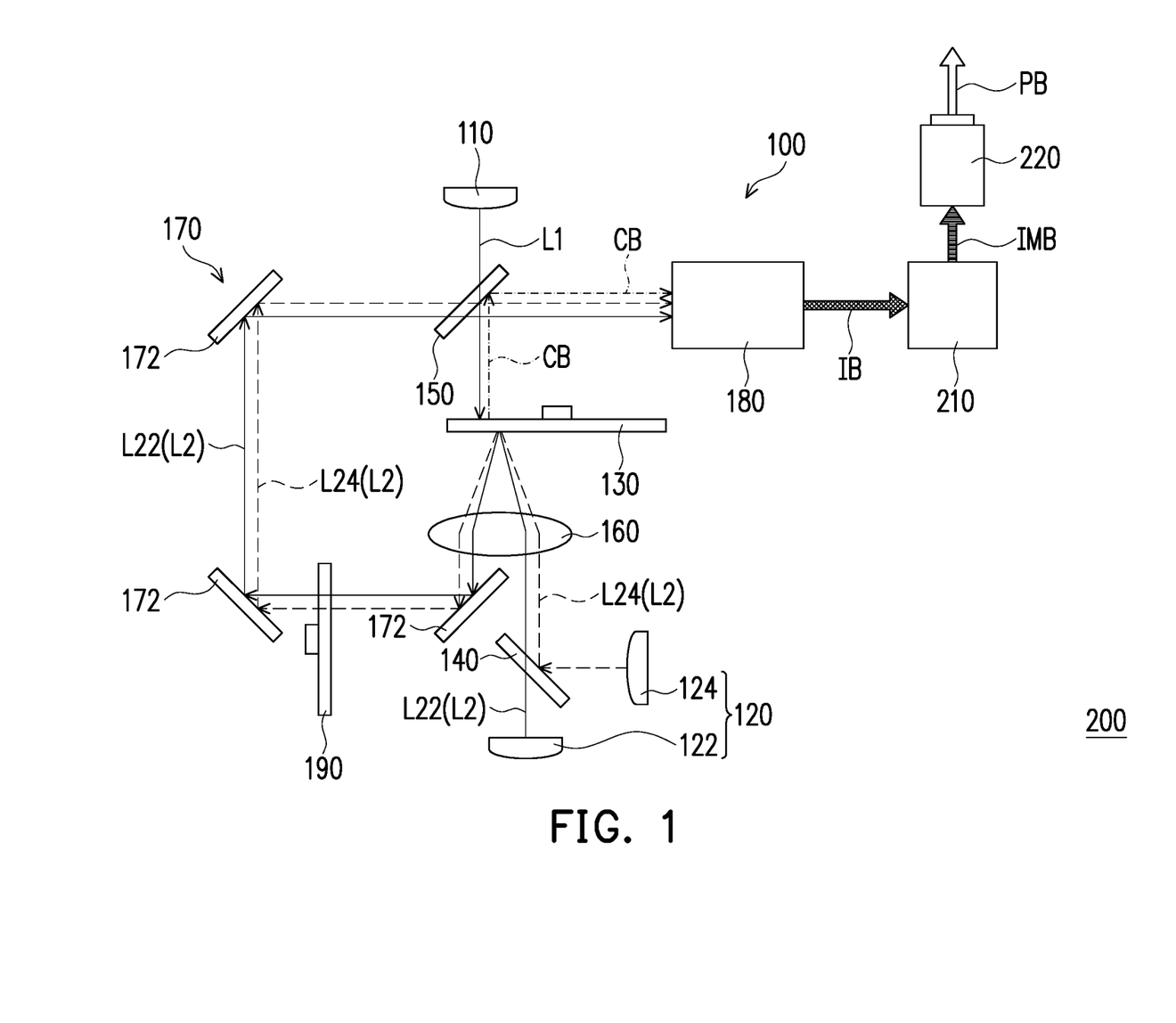
FIG. 1 is a schematic diagram of a projection device according to a first embodiment of the invention.
Figure 2:
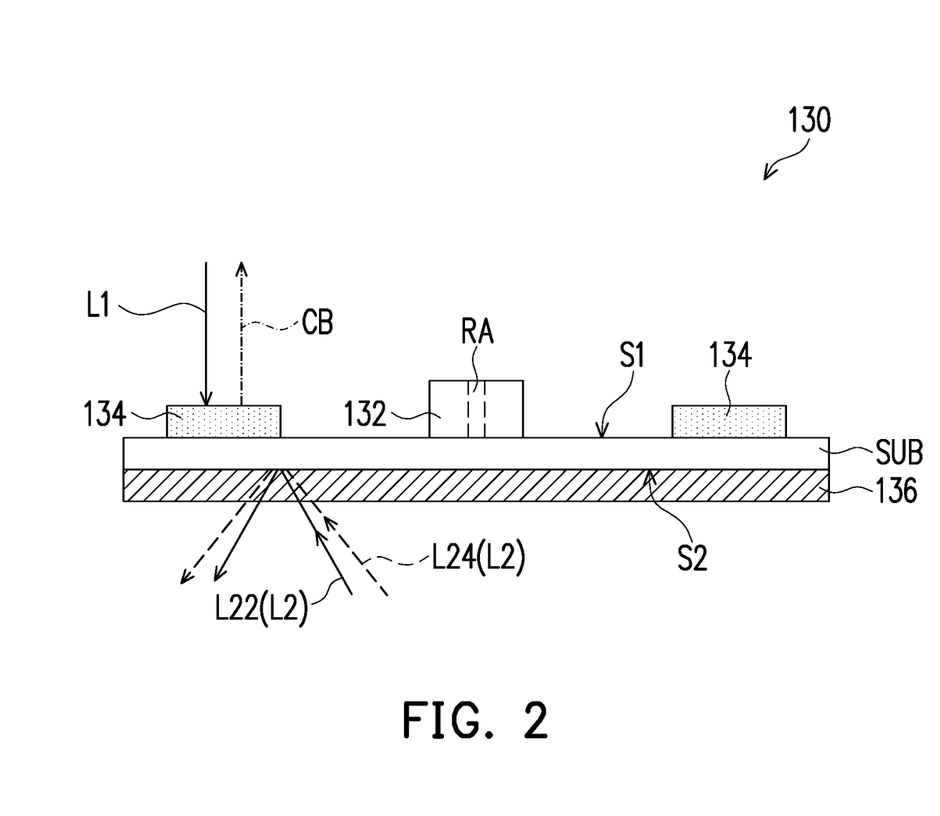
FIG. 2 is a structural schematic diagram of an optical rotating device of FIG. 1.

FIG. 1 is a schematic diagram of a projection device according to a first embodiment of the invention. FIG. 2 is a structural schematic diagram of an optical rotating device of FIG. 1. Referring to FIG. 1, the projection device 200 of the embodiment is used for providing a projection beam PB. The projection device 200 includes an illumination system 100, at least one light valve 210 and a projection lens 220. The illumination system 100 is used for providing an illumination beam IB. The at least one light valve 210 is disposed on a transmission path of the illumination beam IB to convert the illumination beam IB into an image beam IMB. The projection lens 220 is disposed on a transmission path of the image beam IMB, and is used for projecting the image beam IMB out of the projection device 200 to form the projection beam PB, and the projection beam PB forms an image on a screen or a wall (not shown). Since after the illumination beam IB of different colors irradiates the at least one light valve 210, the at least one light valve 210 receives the illumination beam IB of different colors to output the image beam IMB in a time sequence, and transmits the image beam IMB to the projection lens 220. Therefore, the image formed by the image beam IMB outputted by the at least one light valve 210 and projected out from the projection device 200 may be a color image. In the embodiment, the number of the light value 210 may be one, two or three, and operation modes thereof are schematically described later with reference of FIG. 3.

In the embodiment, the light valve 210 is, for example, a Digital Micro-mirror Device (DMD) or a Liquid-Crystal-On-Silicon (LCOS) panel. However, in other embodiments, the light valve 210 may also be a transmissive liquid crystal panel or other spatial light modulator. In the embodiment, the projection lens 220 is, for example, one optical lens or a combination of a plurality of optical lens with refractive power, and the optical lens, for example, includes a non-planar lens such as a biconcave lens, a biconvex lens, a concavo-convex lens, a convexo-concave lens, a plano-convex lens, a plano-concave lens, etc, or various combinations thereof. The pattern and type of the projection lens 220 are not limited by the invention.

Moreover, in some embodiments, the projection device 200 may selectively include optical elements with focusing, refracting or reflecting functions for guiding the illumination beam IB emitted by the illumination system 100 to the at least one light valve 210, and guiding the image beam IMB outputted by the at least one light valve 210 to the projection lens 220, so as to generate the projection beam PB, but the invention is not limited thereto.

In application of the 3D display technique, the projection device 200 of the embodiment may be used as a polarized stereoscopic image projector. To be specific, when the two projection devices 200 are in a polarization stereoscopic mode (i.e., polarizers are disposed outside the projection lenses 220 or the polarizers are built in the projection devices 200), the projection beams PB provided by the two projection devices 200 may respectively pass through the polarizers to generate images of different polarization states, a user may observe a stereoscopic display image through polarized stereoscopic glasses, for example, the polarized stereoscopic glasses worn by the user are respectively equipped with two polarizing elements for a left-eye lens and a right-eye lens, and the two polarizing elements correspond to the images with the polarization states generated by the polarizers of the two projection devices, such that the left and right eyes of the user respectively receive the images projected by the corresponding projection devices, so as to achieve the stereoscopic display effect.

As shown in FIG. 1, the illumination system 100 includes a first laser light source unit 110, a second laser light source unit 120 and an optical rotating device 130. The first laser light source unit 110 is configured to emit a first laser beam L1. The second laser light source unit 120 is configured to emit at least one second laser beam L2. In the embodiment, the second laser light source unit 120 includes a first color laser light source 122 and a second color laser light source 124. The first color laser light source 122 and the second color laser light source 124 respectively emit a first color laser beam L22 and a second color laser beam L24, where the at least one second laser beam L2 includes the first color laser beam L22 and the second color laser beam L24.

In the embodiment, the first laser light source unit 110 and the first color laser light source 122 and the second color laser light source 124 of the second laser light source unit 120 are respectively laser light-emitting elements including laser diodes. To be specific, the first laser light source unit 110 and the first color laser light source 122 of the second laser light source unit 120 are, for example, respectively a blue laser diode bank, and the first laser beam L1 and the first color laser beam L22 are respectively a blue laser beam. The second color laser light source 124 of the second laser light source unit 120 is, for example, a red laser diode bank, and the second color laser beam L24 is a red laser beam. For example, a main wavelength (a peak wavelength) of the first laser beam L1 is, for example, 445 nm, a main wavelength of the first color laser beam L22 is, for example, 460 nm, and a main wavelength of the second color laser beam L24 is, for example, 638 nm, but the invention is not limited thereto. In the embodiment, the main wavelengths of the first laser beam L1 and the first color laser beam L22 are, for example, different, and in other embodiments, the main wavelengths of the first laser beam L1 and the first color laser beam L22 may also be the same.

Referring to FIG. 1 and FIG. 2, in the embodiment, the optical rotating device 130 may be a rotatable disk-like element, which is disposed on transmission paths of the first laser beam L1 and the at least one second laser beam L2 (i.e. the first color laser beam L22 and the second color laser beam L24). The optical rotating device 130 includes a substrate SUB, a rotation shaft RA, a driving element 132, a wavelength conversion layer 134 and a polarizing element 136. The substrate SUB has a first surface S1 and a second surface S2 opposite to each other. The rotating shaft RA is connected to a center of the substrate SUB. The driving element 132 is connected to the rotating shaft RA, and is configured to drive the rotating shaft RA to rotate, so as to drive the substrate SUB to rotate along the rotation shaft RA serving as a rotation central axis.

The wavelength conversion layer 134 is disposed on the first surface Si of the substrate SUB, and is disposed on the transmission path of the first laser beam L1 to convert the first laser beam L1 into the converted beam CB, where main wavelengths of the first laser beam L1 and the converted beam CB are different. The wavelength conversion layer 134 is, for example, arranged on the first surface Si in an 0-ring shape, and cuts into the transmission path of the first laser beam L1 in a rotating manner. The wavelength conversion layer 134 includes a wavelength conversion substance, and the wavelength conversion substance, for example, includes a phosphor powder capable of generating a yellow light beam and a phosphor powder capable of generating a green light beam (which are referred to as a yellow phosphor powder and a green phosphor powder hereinafter). The yellow phosphor powder and the green phosphor powder are evenly blended and distributed in the wavelength conversion layer 134.

The polarizing element 136 is disposed on the second surface S2 of the substrate SUB, and is disposed on the transmission path of the at least one second laser beam L2. The driving element 132 drives the substrate SUB, the wavelength conversion layer 134 and the polarizing element 136 to rotate along the rotation shaft RA serving as the rotation central axis. When the polarizing element 136 is rotated, the at least one second laser beam L2 is incident on the polarizing element 136, and the at least one second laser beam L2 outputted from the polarizing element 136 has different polarization states at different times. The polarizing element 136 of FIG. 2, for example, entirely covers (attaches) the second surface S2 of the substrate SUB, however, in other embodiment, the polarizing element 136 may partially cover the second surface S2 of the substrate SUB, and a configuration range of the polarizing element 136 may be determined according to an irradiation position of the second laser beam L2. For example, if the irradiation position of the second laser beam L2 is close to a peripheral area of the second surface S2 of the substrate SUB, the polarizing element 136 may be only disposed at the peripheral area of the second surface S2 of the substrate SUB in a ring shape. If the irradiation position of the second laser beam L2 is close to a central area of the second surface S2 of the substrate SUB, the polarizing element 136 may be only disposed at the central area of the second surface S2 of the substrate SUB, so as to reduce unnecessary material cost.

In the embodiment, the polarizing element 136 may be, for example, a quarter wave plate, a half wave plate, a depolarizer or a circular polarizer. Since the second laser beam L2 is a polarized light (linear polarization light), the second laser beam L2 irradiates different positions of the rotated polarizing element 136 at different times, and the second laser beam L2 outputted from the polarizing element 136 may change the polarization state in a time sequence due to the type of the polarizing element 136. Therefore, when the polarizing element 136 is rotated, the second laser beam L2 outputted from the polarizing element 136 may have different polarization states at different times. In other words, when the illumination system 100 operates, the second laser beam L2 with different polarization directions and light intensities may be outputted rapidly and continuously through the rotation of optical rotating device 130.

Due to a rotation speed of the optical rotating device 130, the second laser beam L2 of different polarization directions may be controlled within a range that cannot be perceived by human eye, the human eyes will perceive an image with uniform intensity and no specific polarization direction. For example, the rotation speed of the optical rotating device 130 may be greater than or equal to 1800 revolutions per minute (rpm), which is, for example, 1800 rpm, 3600 rpm or 7200 rpm, but the invention is not limited thereto. In this way, when the two projection devices 200 are in the polarization stereoscopic mode (i.e., polarizers are disposed outside the projection lenses 220 or the polarizers are built in the projection devices 200), the second laser beams L2 outputted from the optical rotating devices 130 of the two projection devices 200 may further sequentially penetrate through the projection lenses 220 and the polarizers to produce an image with even color and brightness on the screen, so that the user may observe the stereoscopic display image with better uniformity through the polarized stereoscopic glasses.

It should be noted that the wavelength conversion layer 134 and the polarizing element 136 are integrated into a same device. It is unnecessary to separately provide two independent rotating members. The wavelength conversion layer 134 and the polarizing element 136 may share the same driving element 132, so that a mechanism design is simplified so as to improve flexibility of space application, reduce the cost and reduce a noise source.

In the embodiment, the first surface Si and the second surface S2 of the substrate SUB are reflective surfaces. Therefore, when the first laser beam L1 is transmitted to the wavelength conversion layer 134, the wavelength conversion substance of the wavelength conversion layer 134 is excited by the first laser beam L1 to emit the converted beam CB, and the converted beam CB is reflected by the first surface S1 of the substrate SUB. When the second laser beam L2 is transmitted to the polarizing element 136, the second laser beam L2 sequentially penetrates through the polarizing element 136, is reflected by the second surface S2 of the substrate SUB, and penetrates through the polarizing element 136 again. In other words, the second laser beam L2 penetrates through the polarizing element 136 twice. In the embodiment, the first laser light source unit 110 and the second laser light source unit 120 are respectively located at two opposite sides of the optical rotating device 130, and the wavelength conversion layer 134 and the polarizing element 136 are respectively disposed on two opposite surfaces of the substrate SUB, where the first laser beam L1 and the second laser beam L2 are respectively transmitted to wavelength conversion layer 134 and the polarizing element 136 from opposite directions, and the converted beam CB and the second laser beam L2 are respectively outputted in opposite directions.

In detail, the substrate SUB may be made of a metal material (for example, aluminium), and the two opposite surfaces of the substrate SUB may be coated with a coating layer (for example, silver) with high reflectivity, so as to reduce optical loss. Moreover, since the metal has good thermal conductivity, the substrate SUB made of the metal material avails heat dissipation of the wavelength conversion layer 134, so as to avoid reduction of optical conversion efficiency of the wavelength conversion layer 134 or burning the wavelength conversion layer 134.

As shown in FIG. 1, the illumination system 100 further includes a light combining element 140, a light combining element 150, a lens 160, a light transmitting module 170, a light uniforming element 180 and a diffusion device 190. The light combining element 140 is disposed on transmission paths of the first color laser beam L22 emitted from the first color laser light source 122 and the second color laser beam L24 emitted from the second color laser light source 124, and located between the first color laser light source 122 of the second laser light source unit 120 and the optical rotating device 130. To be specific, the light combining element 140 is, for example, a Dichroic Mirror (DM) or a dichroic prism, and is adapted to provide different optical effects to light beams of different colors. In the embodiment, the light combining element 140 is a Dichroic Mirror which reflects red light (DMR) that allows the first color laser beam L22 (the blue laser beam) to pass therethrough and reflects the second color laser beam L24 (the red laser beam), and the first color laser beam L22 and the second color laser beam L24 coming from different transmission directions are guided to a same transmission direction after being outputted from the light combining element 140, so that the light combining element 140 may be used for transmitting the first color laser beam L22 and the second color laser beam L24 coming from the second laser light source unit 120 to the lens 160.

The lens 160 is disposed on the transmission paths of the first color laser beam L22 and the second color laser beam L24 (the second laser beam L2) coming from the light combining element 140, and is located between the second laser light source unit 120 and the optical rotating device 130. As shown in FIG. 1 and FIG. 2, the second laser beam L2 emitted by the second laser light source unit 120 eccentrically penetrates through the lens 160 and is incident to the polarizing element 136, and the second laser beam L2 reflected by the second surface S2 of the substrate SUB eccentrically penetrates through the lens 160 and is transmitted to the light transmitting module 170. In other words, when the second laser beam L2 emitted by the second laser light source unit 120 is incident to the lens 160, a light spot formed by the second laser beam L2 on the lens 160 deviates from a central axis (an optical axis) of the lens 160, and when the second laser beam L2 reflected by the second surface S2 of the substrate SUB is incident to the lens 160, a light spot formed by the second laser beam L2 on the lens 160 also deviates from the central axis (the optical axis) of the lens 160. As shown in FIG. 1, the second laser beam L2 emitted by the second laser light source unit 120 is incident to a right half part of the lens 160, and the second laser beam L2 reflected by the substrate SUB is emitted out from a left half part of the lens 160.

The light transmitting module 170 includes a plurality of reflection mirrors 172, the reflection mirrors 172 are disposed on the transmission path of the second laser beam L2, and are configured to transmit the second laser beam L2 coming from the polarizing element 136 to the light combining element 150.

The light combining element 150 is disposed on transmission paths of the first laser beam L1 coming from the first laser light source unit 110, the second laser beam L2 coming from the light transmitting module 170 and the converted beam CB coming from the wavelength conversion layer 134 of the optical rotating device 130, and is located between the first laser light source unit 110 and the optical rotating device 130. To be specific, the light combining element 150 is, for example, a dichroic mirror or a dichroic prism, and is adapted to provide different optical effects to light beams of different colors. In the embodiment, the light combining element 150 is a Dichroic Mirror which reflects yellow light (DMY) which allows the first laser beam L1 and the second laser beam L2 to pass through and reflects the converted beam CB, so that the light combining element 150 is used for combining the second laser beam L2 coming from the light transmitting module 170 and the converted beam CB coming from the wavelength conversion layer 134, and transmitting the same to the light uniforming element 180.

The light uniforming element 180 refers to an optical element capable of uniforming a light beam passing through the light uniforming element 180. In the embodiment, the light uniforming element 180 is disposed on transmission paths of the second laser beam L2 and the converted beam CB coming from the light combining element 150 to form the illumination beam IB for outputting to the at least one light valve 210. In other words, the illumination beam IB includes the second laser beam L2 and the converted beam CB. In the embodiment, the light uniforming element 180 is, for example, an integration rod. In other embodiments, the light uniforming element 180 may also be a lens array or other optical element having a light uniforming effect.

The diffusion device 190 is disposed on the transmission path of the second laser beam L2. The diffusion device 190 may be a rotatable disk-like element, and the diffusion device 190 may be configured with a diffuser, diffusion particles or a diffusion structure for reducing or eliminating a speckle phenomenon of the second laser beam L2.

Figure 3:
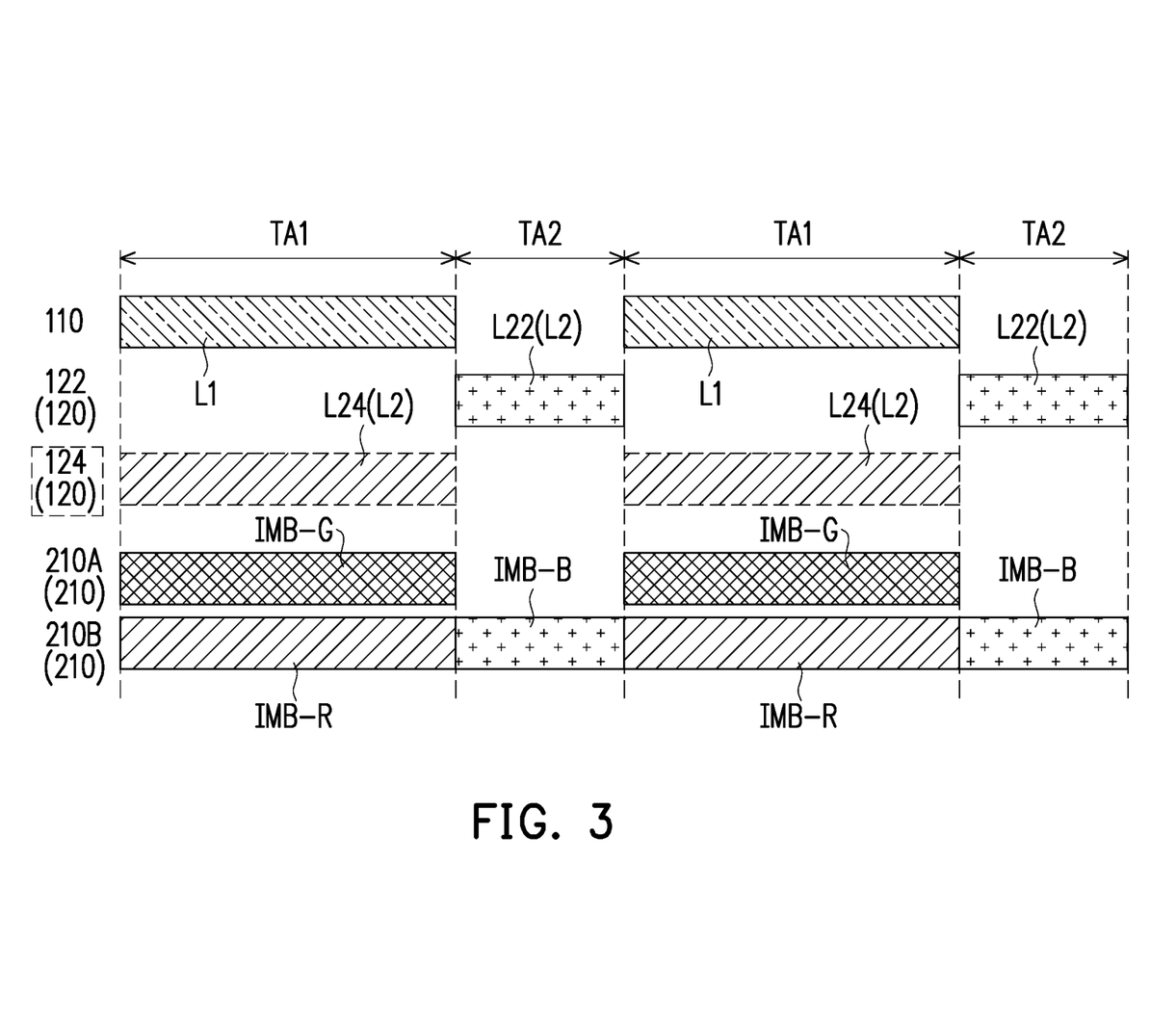
FIG. 3 is a schematic diagram of an operation mode according to the first embodiment of the invention.

FIG. 3 is a schematic diagram of an operation mode according to the first embodiment of the invention. A process that the projection device 200 provides the projection image is described below with reference of FIG. 1 to FIG. 3 under conditions that, for example, the number of the light valves 210 is two (for example, two DMDs are adopted), for example, the light valves 210 include a light valve 210A and a light valve 210B, and a light splitting module (not shown) is disposed between the light uniforming element 180 and the light valves 210 to respectively transmit the light beams of different colors to the light valve 210A and the light valve 210B.

Referring to FIG. 1 to FIG. 3, in a first time interval TA1, the first laser light source unit 110 is turned on to emit the first laser beam L1 (for example, blue light), the first color laser light source 122 of the second laser light source unit 120 is turned off, and the second color laser light source 124 of the second laser light source unit 120 is turned on to emit the second color laser beam L24 (for example, red light). In the first time interval TA1, the wavelength conversion layer 134 of the optical rotating device 130 converts the first laser beam L1 into the converted beam CB (for example, yellow green light). In the first time interval TA1, the light valve 210A and the light valve 210B are switched to a first state, a green light part of the converted beam CB is incident to the light valve 210A, the second color laser beam L24 and a red light part in the converted beam CB are incident to the light valve 210B. The light valve 210A converts the green light part of the converted beam CB into a green image beam IMB-G, and the light valve 210B converts the second color laser beam L24 and the red light part of the converted beam CB into a red image beam IMB-R. The green image beam IMB-G and the red image beam IMB-R are projected to a projection target (for example, a screen or a wall) through the projection lens 220 to form a green and red color image.

Referring to FIG. 1 to FIG. 3, in a second time interval TA2, the first laser light source unit 110 is turned off, the first color laser light source 122 of the second laser light source unit 120 is turned on to emit the first color laser beam L22 (for example, blue light), and the second color laser light source 124 of the second laser light source unit 120 is turned off. In the second time interval TA2, the light valve 210A is switched to an idle state, and the light valve 210B is switched to a second state. The first color laser beam L22 is incident to the light valve 210B, and the light valve 210B converts the first color laser beam L22 into a blue image beam IMB-B. The blue image beam IMB-B is projected to the projection target (for example, a screen or a wall) through the projection lens 220 to form a blue color image.

As described above, the projection device 200 projects the green image beam IMB-G and the red image beam IMB-R in the first time interval TA1, and projects the blue image beam IMB-B in the second time interval TA2 to the projection target (for example, a screen or a wall), and based on the principle of visual persistence of human eyes, the produced green, red, and blue color images may constitute a required color projection image.

Moreover, when the number of the light valves 210 is three (for example, 3 DMDs are adopted), after the light valves are turned on, it is unnecessary to turn off the first laser light source unit 110 and the second laser light source unit 120 in different time intervals, and the three light valves 210 respectively convert the second color laser beam L24 and the red light part in and the converted beam CB, the green light part in the converted beam CB and the first color laser beam L22 into the red image beam IMB-R, the green image beam IMB-G and the blue image beam IMB-B according to a time sequence. Moreover, in some embodiments, the second laser light source unit 120 may not include the second color laser light source 124, and the red image beam IMB-R is provided by the red light part in the converted beam CB.

It should be noted that a part of content of the aforementioned embodiment is also used in the following embodiment, and descriptions of the same technical content are omitted, a part of the content of the aforementioned embodiment may be referred for description of the same devices, and detailed descriptions thereof are not repeated in the following embodiment.

Figure 4:
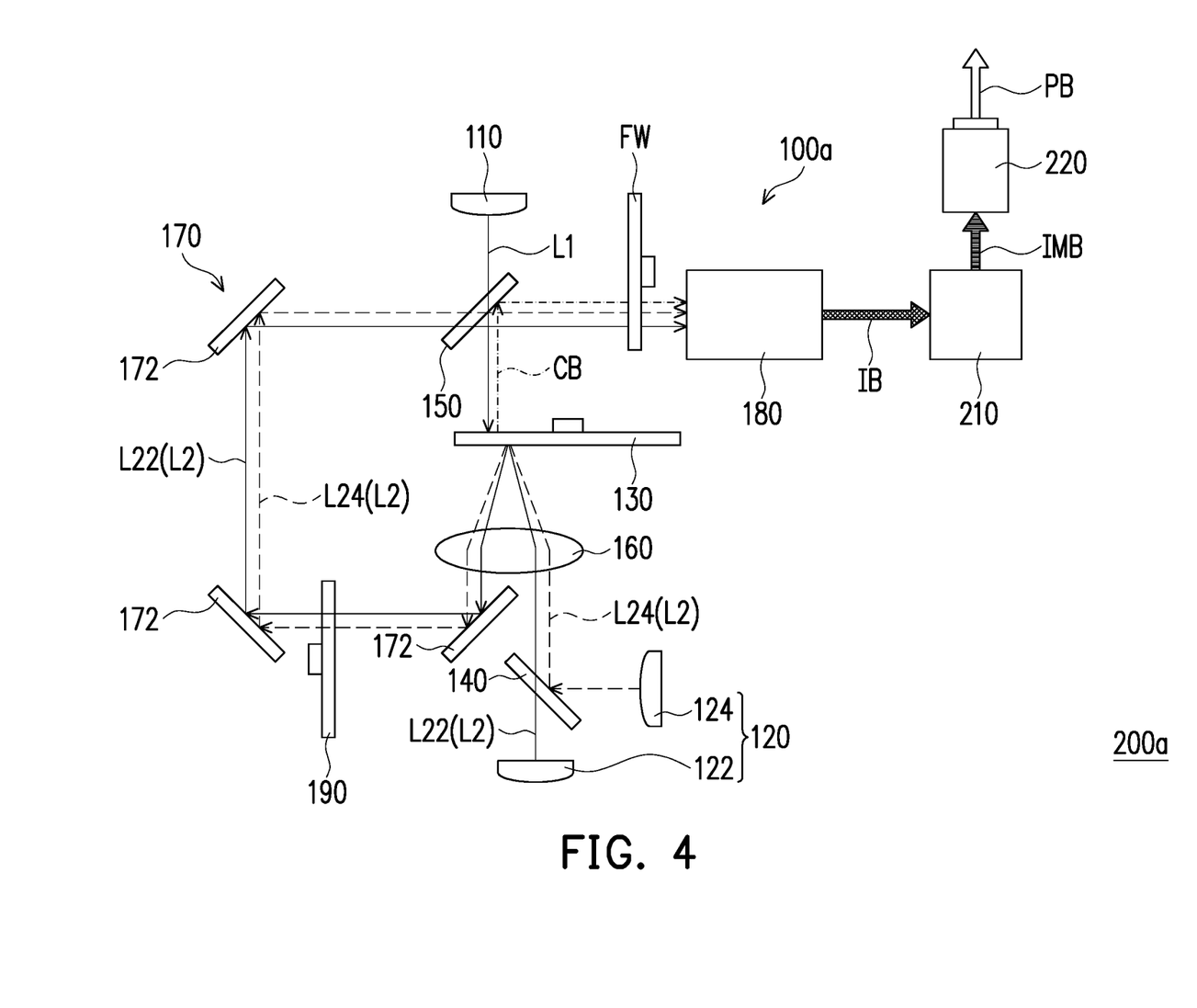
FIG. 4 is a schematic diagram of a projection device according to a second embodiment of the invention.

FIG. 4 is a schematic diagram of a projection device according to a second embodiment of the invention. Referring to FIG. 4, the projection device 200a of the embodiment is similar to the projection device 200 of FIG. 1, and a main difference there between in framework is that the illumination system 100a of the projection device 200 of the embodiment further includes a filter device FW, and the number of the light valve 210 is one.

In the embodiment, the filter device FW may be a rotatable disk-like element, for example, a filter wheel. The filter device FW is configured to filter (reflect or adsorb) beams other than a light beam of a specific wavelength range and allow the light beam of the specific wavelength range to pass therethrough, so as to improve color purity of the color light to form the illumination beam IB. Moreover, the wavelength conversion substance of the wavelength conversion layer 134 of the optical rotating device 130, for example, includes a phosphor powder capable of generating a yellow light beam and a phosphor powder capable of generating a green light beam (which are referred to as a yellow phosphor powder and a green phosphor powder hereinafter). The yellow phosphor powder and the green phosphor powder are respectively disposed at different regions of the wavelength conversion layer 134, and the yellow phosphor powder and the green phosphor powder form an 0-ring shape and sequentially cut into the transmission path of the first laser beam L1.

Figure 5:
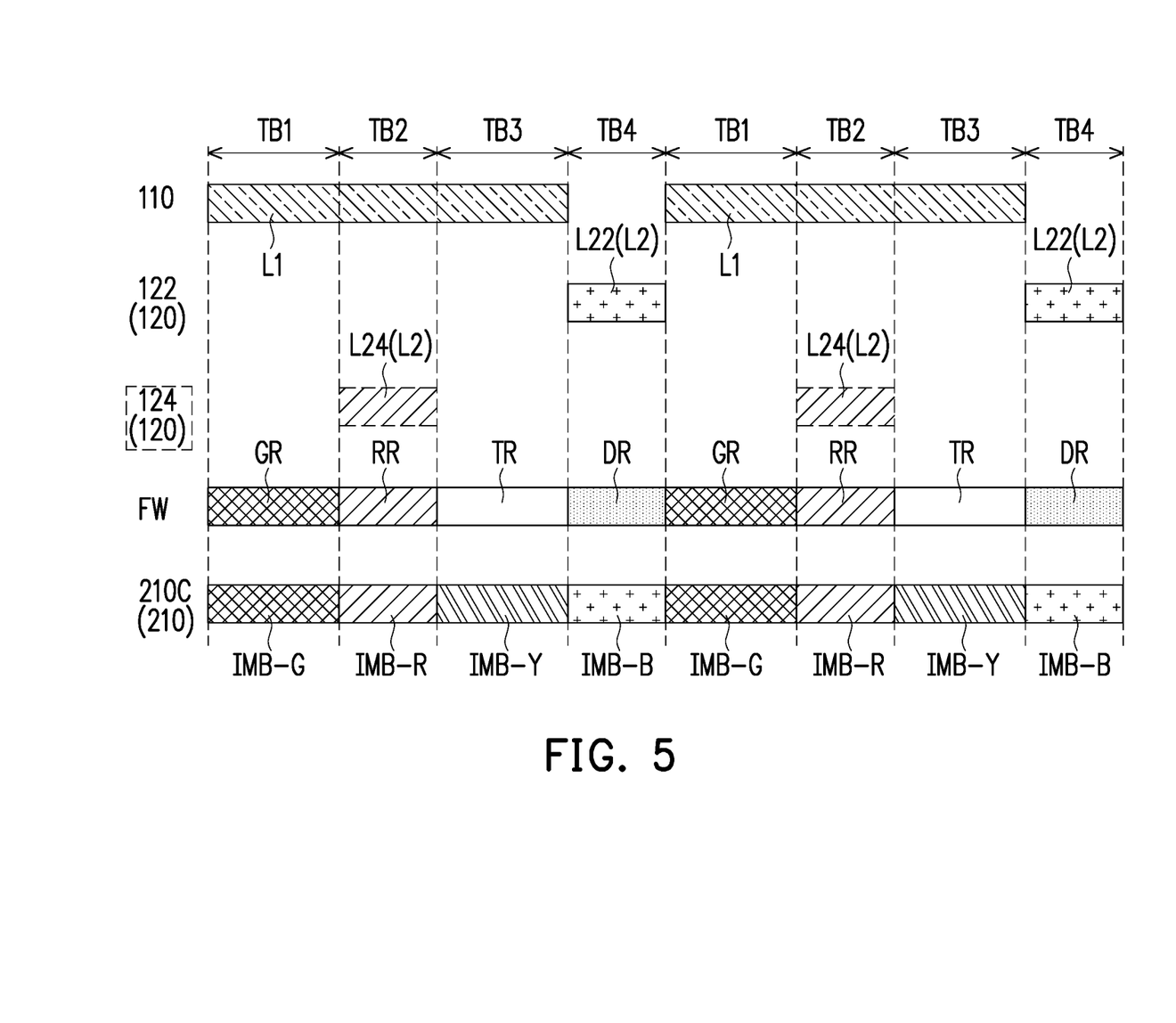
FIG. 5 is a schematic diagram of an operation mode according to the second embodiment of the invention.

FIG. 5 is a schematic diagram of an operation mode according to the second embodiment of the invention. A process that the projection device 200a provides the projection image is described below with reference of FIG. 4 to FIG. 5 under a condition that the number of the light valve 210 is one (for example, one DMD is adopted), for example, the light valve 210C. In the embodiment, the filter device FW may include a plurality of sub-filter regions. For example, the filter device FW of the embodiment may include a green filter region GR, a red filter region RR, a transparent region TR and a diffusion region DR.

Referring to FIG. 4 to FIG. 5, in a first time interval TB1, the first laser light source unit 110 is turned on to emit the first laser beam L1 (for example, blue light), the first color laser light source 122 and the second color laser light source 124 of the second laser light source unit 120 are turned off. In the first time interval TB1, the region configured with the green phosphor powder in the wavelength conversion layer 134 of the optical rotating device 130 is cut into the transmission path of the first laser beam L1 to convert the first laser beam L1 into the green converted beam CB, and the green filter region GR of the filter device FW is cut into a transmission path of the green converted beam CB to allow the green converted beam CB to pass therethrough. In the first time interval TB1, the light valve 210C is switched to the first state, the green converted beam CB is incident to the light valve 210C, and the light valve 210C converts the green converted beam CB into the green image beam IMB-G. The green image beam IMB-G is projected to the projection target (for example, a screen or a wall) to form a green color image.

Referring to FIG. 4 to FIG. 5, in a second time interval TB2, the first laser light source unit 110 is continuously turned on to emit the first laser beam L1 (for example, blue light), the first color laser light source 122 of the second laser light source unit 120 is turned off, and the second color laser light source 124 of the second laser light source unit 120 is turned on to emit the second color laser beam L24 (for example, red light). In the second time interval TB2, the region configured with the yellow phosphor powder in the wavelength conversion layer 134 of the optical rotating device 130 is cut into the transmission path of the first laser beam L1 to convert the first laser beam L1 into the yellow converted beam CB, and the red filter region RR of the filter device FW is cut into the transmission path of the yellow converted beam CB and the second color laser beam L24 to allow a yellow light part of the converted beam CB and the second color laser beam L24 to pass therethrough. In the second time interval TB2, the light valve 210C is switched to the second state, a red light part of the yellow converted beam CB and the second color laser beam L24 are incident to the light valve 210C, and the light valve 210C converts the red light part of the yellow converted beam CB and the second color laser beam L24 into the red image beam IMB-R. The red image beam IMB-R is projected to the projection target (for example, a screen or a wall) to form a red color image. Moreover, in some embodiments, the second laser light source unit 120 may not include the second color laser light source 124, and the red image beam IMB-R is provided by the red light part in the yellow converted beam CB.

Referring to FIG. 4 to FIG. 5, in a third time interval TB3, the first laser light source unit 110 is continuously turned on to emit the first laser beam L1 (for example, blue light), the first color laser light source 122 of the second laser light source unit 120 is turned off, and the second color laser light source 124 of the second laser light source unit 120 is turned off. In the third time interval TB3, the region configured with the yellow phosphor powder in the wavelength conversion layer 134 of the optical rotating device 130 is cut into the transmission path of the first laser beam L1 to convert the first laser beam L1 into the yellow converted beam CB, and the transparent region TR of the filter device FW is cut into the transmission path of the yellow converted beam CB to allow the yellow converted beam CB to pass therethrough. In the third time interval TB3, the light valve 210C is switched to a third state, the yellow converted beam CB is incident to the light valve 210C, and the light valve 210C converts the yellow converted beam CB into a yellow image beam IMB-Y. The yellow image beam IMB-Y is projected to the projection target (for example, a screen or a wall) to form a yellow color image.

Referring to FIG. 4 to FIG. 5, in a fourth time interval TB4, the first laser light source unit 110 is turned off, the first color laser light source 122 of the second laser light source unit 120 is turned on to emit the first color laser beam L22 (for example, blue light), and the second color laser light source 124 of the second laser light source unit 120 is turned off. In the fourth time interval TB4, the diffusion region DR of the filter device FW is cut into the transmission path of the first color laser beam L22 to allow the first color laser beam L22 to pass therethrough and reduce or eliminate the speckle phenomenon of the first color laser beam L22. In the fourth time interval TB4, the light valve 210C is switched to a fourth state, the first color laser beam L22 is incident to the light valve 210C, and the light valve 210C converts the first color laser beam L22 into the blue image beam IMB-B. The blue image beam IMB-B is projected to the projection target (for example, a screen or a wall) to form a blue color image.

As described above, the projection device 200a projects the green image beam IMB-G to the projection target (for example, a screen or a wall) in the first time interval TB1, projects the red image beam IMB-R to the projection target in the second time interval TB2, projects the yellow image beam IMB-Y to the projection target in the third time interval TB3, and projects the blue image beam IMB-B to the projection target in the fourth time interval TB4, so as to provide the green image beam IMB-G, the red image beam IMB-R, the yellow image beam IMB-Y and the blue image beam IMB-B in a time sequence, and based on the principle of visual persistence of human eyes, the produced green, red, yellow and blue color images may constitute a required color projection image.

Figure 6:
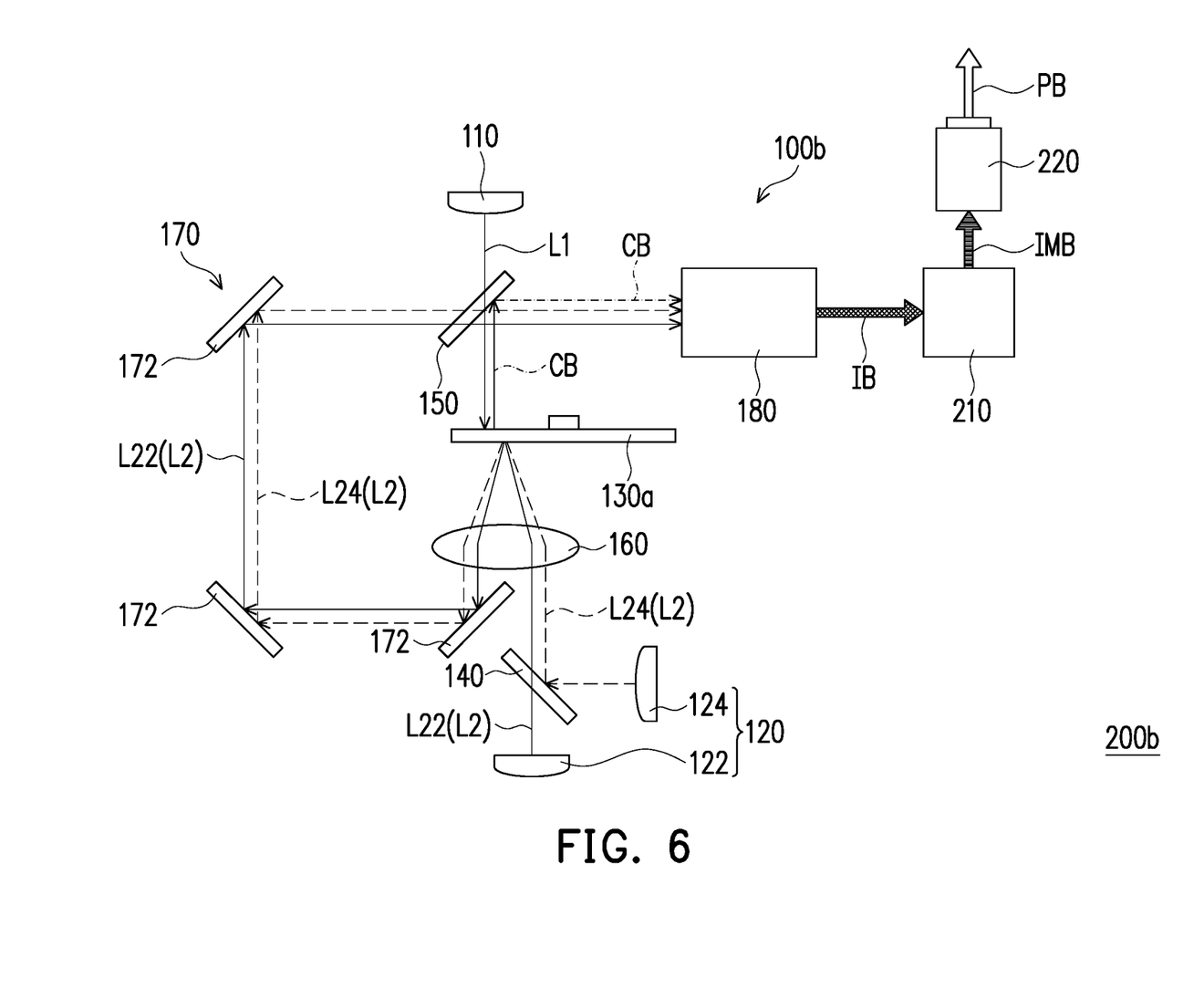
FIG. 6 is a schematic diagram of a projection device according to a third embodiment of the invention.
Figure 7:
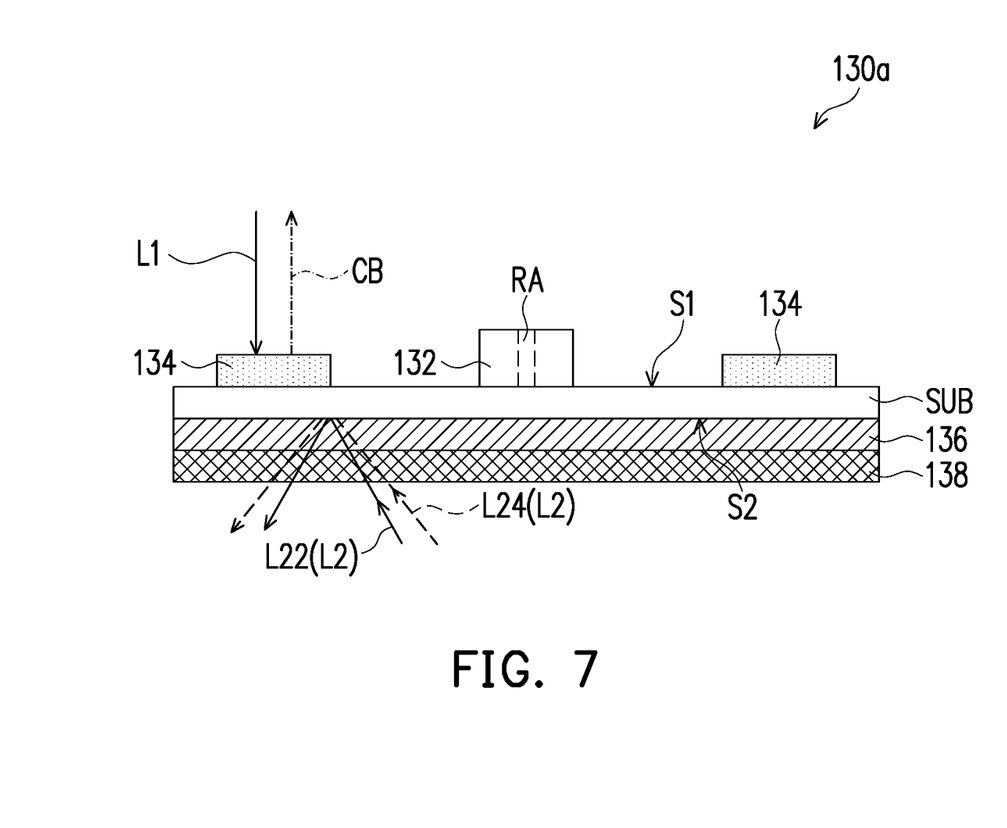
FIG. 7 to FIG. 9 are structural schematic diagrams of an optical rotating device of FIG. 6 in different embodiments.
Figure 8:
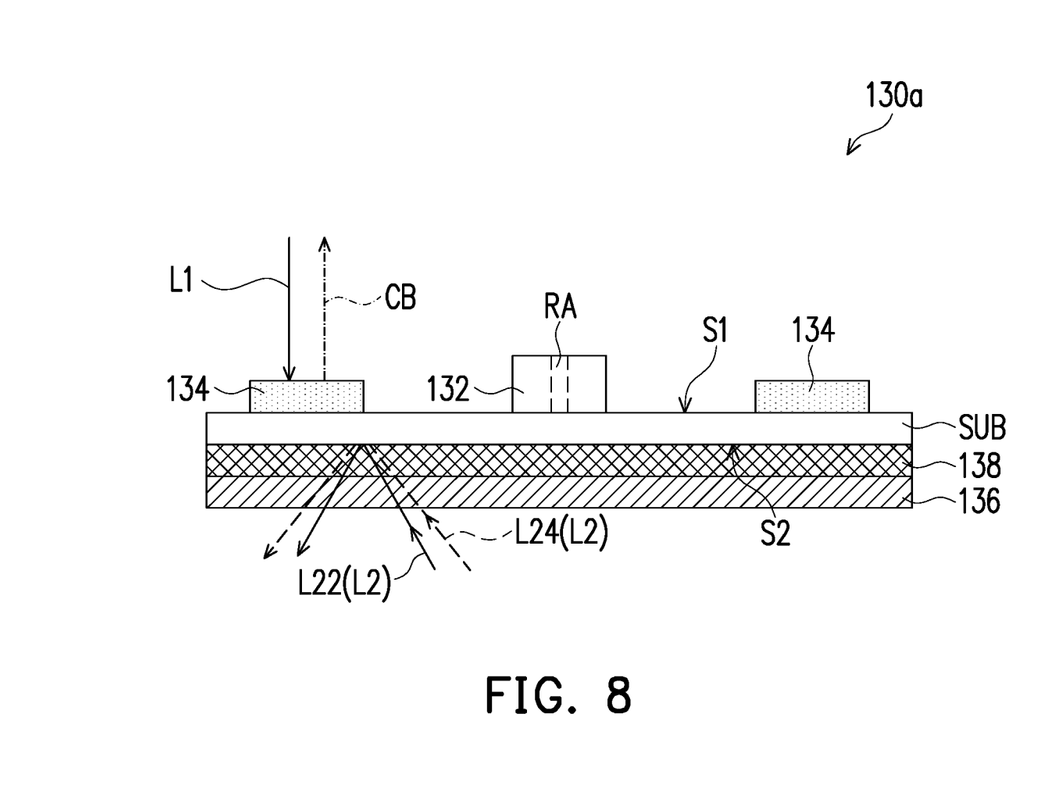
Figure 9:
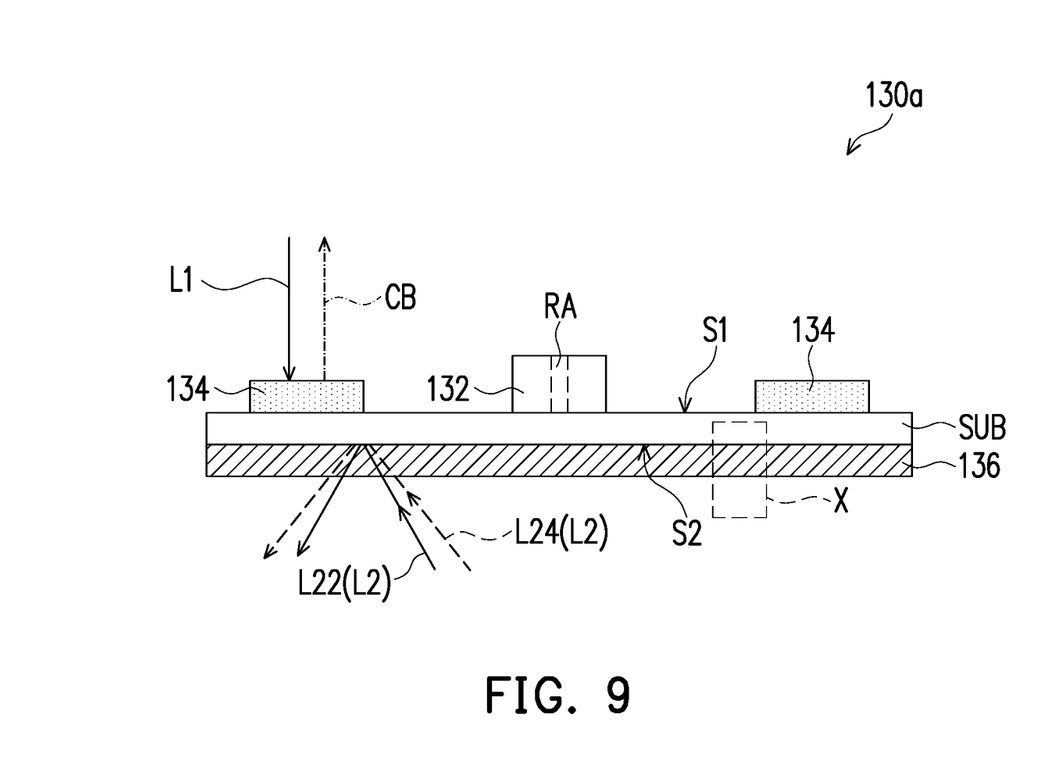
Figure 10A:
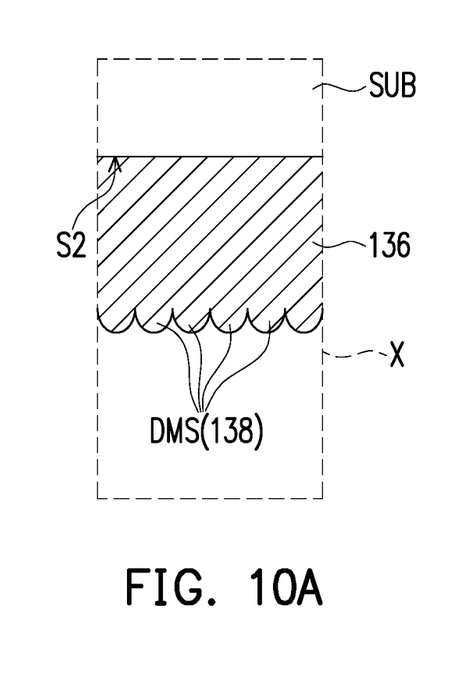
FIG. 10A to FIG. 10C are partial enlarged views of a region X in FIG. 9 in different embodiments.
Figure 10B:
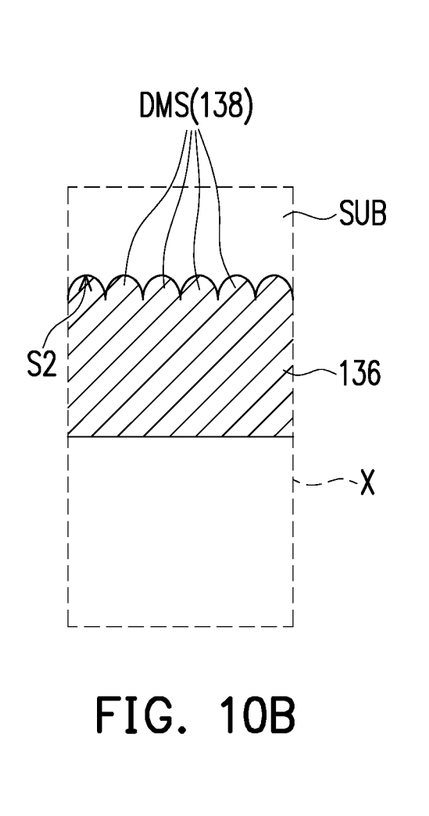
Figure 10C:
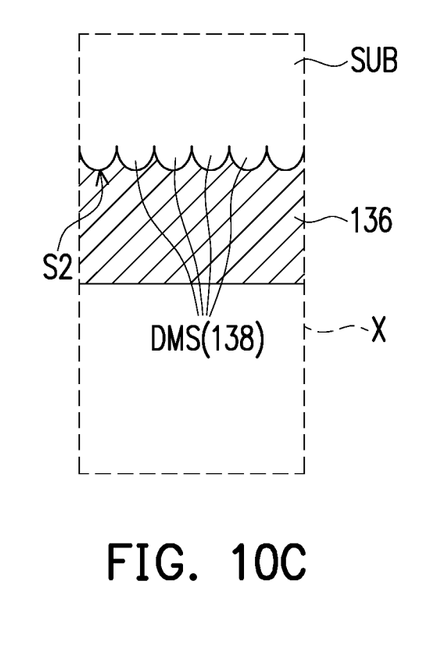

FIG. 6 is a schematic diagram of a projection device according to a third embodiment of the invention. FIG. 7 to FIG. 9 are structural schematic diagrams of the optical rotating device of FIG. 6 in different embodiments. FIG. 10A to FIG. 10C are partial enlarged views of a region X in FIG. 9 in different embodiments. Referring to FIG. 6 to FIG. 10C, the projection device 200b of the embodiment is similar to the projection device 200 of FIG. 1, and a main difference there between in framework is that in the illumination system 100b of the projection device 200b of the embodiment, the diffusion device is integrated to the optical rotating device. In other words, the embodiment does not have the diffusion device 190 of FIG. 1, but the optical rotating device 130a further includes a diffusion element 138. The diffusion element 138 is disposed on the second surface S2 of the substrate SUB, and is overlapped with the polarizing element 136.

As shown in FIG. 7, the polarizing element 136 is located between the diffusion element 138 and the second surface S2 of the substrate SUB. As shown in FIG. 8, the diffusion element 138 is located between the polarizing element 136 and the second surface S2 of the substrate SUB. As shown in FIG. 9, FIG. 10A and FIG. 10B, the diffusion element 138 is diffusion microstructures DMS, and the diffusion microstructures DMS are disposed on any surface of the polarizing element 136, where the diffusion microstructures DMS may be disposed on the surface of the polarizing element 136 away from the substrate SUB (FIG. 10A), and the diffusion microstructures DMS may also be disposed on the surface of the polarizing element 136 facing the substrate SUB (FIG. 10B). As shown in FIG. 9 and FIG. 10C, the diffusion element 138 is the diffusion microstructures DMS, and the diffusion microstructures DMS are disposed on the second surface S2 of the substrate SUB. The diffusion microstructures DMS may be in arc shapes or in other suitable regular or in irregular shapes.

It should be noted that in the embodiment, the wavelength conversion layer 134, the polarizing element 136 and the diffusion element 138 are integrated into one device without separately configuring three independent rotating members, and the wavelength conversion layer 134, the polarizing element 136 and the diffusion element 138 may be driven to be rotated by the same driving element 132, so that a mechanism design is simplified so as to improve flexibility of space application, reduce the cost and reduce a noise source.

Figure 11:
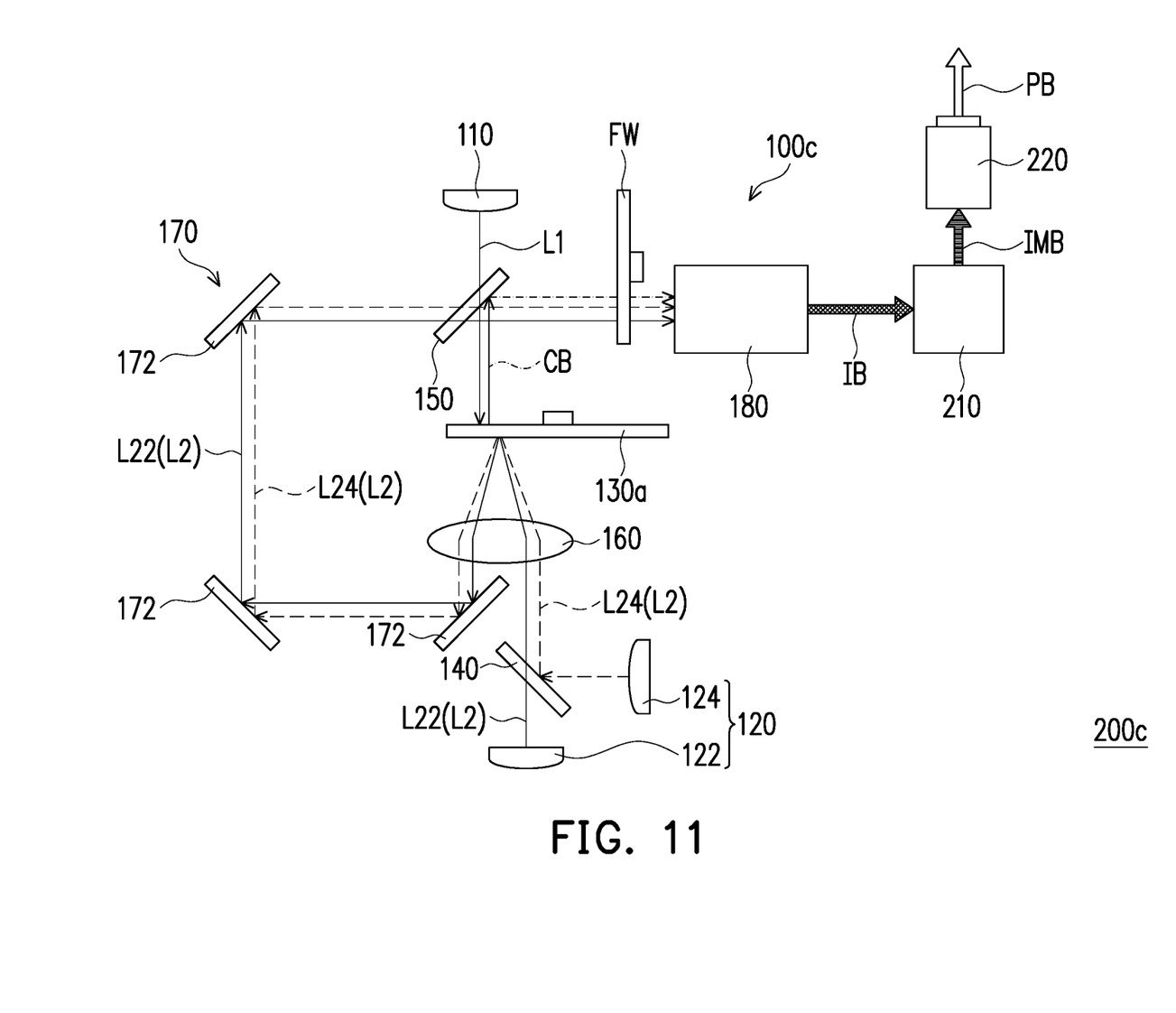
FIG. 11 is a schematic diagram of a projection device according to a fourth embodiment of the invention.

FIG. 11 is a schematic diagram of a projection device according to a fourth embodiment of the invention. Referring to FIG. 11, the projection device 200c of the embodiment is similar to the projection device 200b of FIG. 6, and a main difference there between in framework is that the illumination system 100c of the projection device 200c of the embodiment further includes the filter device FW, and the number of the light valve 210 is one. Related descriptions of the filter device FW and the operation mode of the embodiment may refer to description of the second embodiment, and details thereof are not repeated.

In summary, the embodiments of the invention have at least one of following advantages or effects. In the optical rotating device or the illumination system or the projection device equipped with the optical rotating device of the invention, the driving element is configured to drive the substrate, the wavelength conversion layer and the polarizing element to rotate along the rotating shaft serving as the rotation central axis. Therefore, the at least one second laser beam outputted from the polarizing element has different polarization states at different times. In this way, when the projection device is in a polarized stereoscopic mode (the projection lens with a polarizer disposed outside the projection lens), the color or brightness of the display image is even, so that the user may observe the stereoscopic display image with better uniformity through polarized stereoscopic glasses. Moreover, by integrating the wavelength conversion layer and the polarizing element and/or the diffusion element into the same device, it is unnecessary to respectively configure a plurality of independent rotation members, and the wavelength conversion layer and the polarizing element and/or the diffusion element may be driven to be rotated by the same driving element, so that a mechanism design is simplified so as to improve flexibility of space application, reduce the cost and reduce a noise source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical rotating device, comprising:
a substrate, having a first surface and a second surface opposite to each other;
a rotating shaft, connected to the substrate;
a driving element, connected to the rotating shaft, and configured to drive the rotating shaft to rotate;
a wavelength conversion layer, disposed on the first surface of the substrate, and disposed on a transmission path of a first laser beam to convert the first laser beam into a converted beam; and
a polarizing element, disposed on the second surface of the substrate, and disposed on a transmission path of at least one second laser beam, wherein the first laser beam and the at least one second laser beam are respectively transmitted to the wavelength conversion layer and the polarizing element from opposite directions, the driving element is configured to drive the substrate, the wavelength conversion layer and the polarizing element to rotate along the rotating shaft serving as a rotation central axis, and when the polarizing element is rotated, the at least one second laser beam is incident on the polarizing element, and the at least one second laser beam outputted from the polarizing element has different polarization states at different times.

2. The optical rotating device as claimed in claim 1, wherein the first surface and the second surface of the substrate are reflective surfaces.

3. The optical rotating device as claimed in claim 1, wherein when the at least one second laser beam is transmitted to the polarizing element, the at least one second laser beam sequentially penetrates through the polarizing element, is reflected by the second surface of the substrate and again penetrates through the polarizing element.

4. The optical rotating device as claimed in claim 1, wherein the polarizing element is a quarter wave plate, a half wave plate, a depolarizer or a circular polarizer.

5. The optical rotating device as claimed in claim 1, further comprising:
a diffusion element, disposed on the second surface of the substrate, and overlapped with the polarizing element.

6. The optical rotating device as claimed in claim 5, wherein the polarizing element is located between the diffusion element and the substrate.

7. The optical rotating device as claimed in claim 5, wherein the diffusion element is located between the polarizing element and the substrate.

8. The optical rotating device as claimed in claim 5, wherein the diffusion element is diffusion microstructures, wherein the diffusion microstructures are disposed on any surface of the polarizing element or the second surface of the substrate.

9. An illumination system, configured to provide an illumination beam, and comprising:
- a first laser light source unit, configured to emit a first laser beam;
- a second laser light source unit, configured to emit at least one second laser beam; and
- an optical rotating device, disposed on transmission paths of the first laser beam and the at least one second laser beam, and comprising:
  - a substrate, having a first surface and a second surface opposite to each other;
  - a rotating shaft, connected to the substrate;
  - a driving element, connected to the rotating shaft, and configured to drive the rotating shaft to rotate;
  - a wavelength conversion layer, disposed on the first surface of the substrate, and disposed on the transmission path of the first laser beam to convert the first laser beam into a converted beam, wherein the illumination beam comprises the converted beam and the at least one second laser beam; and
  - a polarizing element, disposed on the second surface of the substrate, and disposed on the transmission path of the at least one second laser beam, wherein the first laser beam and the at least one second laser beam are respectively transmitted to the wavelength conversion layer and the polarizing element from opposite directions, the driving element is configured to drive the substrate, the wavelength conversion layer and the polarizing element to rotate along the rotating shaft serving as a rotation central axis, and when the polarizing element is rotated, the at least one second laser beam is incident on the polarizing element, and the at least one second laser beam outputted from the polarizing element has different polarization states at different times.

10. The illumination system as claimed in claim 9, wherein the first surface and the second surface of the substrate are reflective surfaces.

11. The illumination system as claimed in claim 9, wherein when the at least one second laser beam is transmitted to the polarizing element, the at least one second laser beam sequentially penetrates through the polarizing element, is reflected by the second surface of the substrate and again penetrates through the polarizing element.

12. The illumination system as claimed in claim 9, wherein the polarizing element is a quarter wave plate, a half wave plate, a depolarizer or a circular polarizer.

13. The illumination system as claimed in claim 9, further comprising:
- a diffusion device, disposed on the transmission path of the at least one second laser beam.

14. The illumination system as claimed in claim 9, wherein the optical rotating device further comprises:
- a diffusion element, disposed on the second surface of the substrate, and overlapped with the polarizing element.

15. The illumination system as claimed in claim 14, wherein the polarizing element is located between the diffusion element and the substrate.

16. The illumination system as claimed in claim 14, wherein the diffusion element is located between the polarizing element and the substrate.

17. The illumination system as claimed in claim 14, wherein the diffusion element is diffusion microstructures, wherein the diffusion microstructures are located on any surface of the polarizing element or the second surface of the substrate.

18. The illumination system as claimed in claim 9, further comprising:
- a light combining element, disposed on the transmission paths of the first laser beam, the at least one second laser beam and the converted beam; and
- a light transmitting module, configured to transmit the at least one second laser beam coming from the polarizing element to the light combining element, wherein the light combining element combines the at least one second laser beam coming from the light transmitting module and the converted beam coming from the wavelength conversion layer.

19. The illumination system as claimed in claim 18, further comprising:
- a lens, disposed on the transmission path of the at least one second laser beam and located between the second laser light source unit and the optical rotating device, wherein the at least one second laser beam emitted by the second laser light source unit eccentrically penetrates through the lens and is incident to the polarizing element, and the at least one second laser beam reflected by the second surface of the substrate eccentrically penetrates through the lens and is transmitted to the light transmitting module.

20. A projection device, comprising:
- an illumination system, configured to provide an illumination beam, and comprising:
  - a first laser light source unit, configured to emit a first laser beam;
  - a second laser light source unit, configured to emit at least one second laser beam; and
  - an optical rotating device, disposed on transmission paths of the first laser beam and the at least one second laser beam, and comprising:
    - a substrate, having a first surface and a second surface opposite to each other;
    - a rotating shaft, connected to the substrate;
    - a driving element, connected to the rotating shaft, and configured to drive the rotating shaft to rotate;
    - a wavelength conversion layer, disposed on the first surface of the substrate,
    - and disposed on the transmission path of the first laser beam to convert the first laser beam into a converted beam, wherein the illumination beam comprises the converted beam and the at least one second laser beam; and
  - a polarizing element, disposed on the second surface of the substrate, and disposed on the transmission path of the at least one second laser beam, wherein the first laser beam and the at least one second laser beam are respectively transmitted to the wavelength conversion layer and the polarizing element from opposite directions, the driving element is configured to drive the substrate, the wavelength conversion layer and the polarizing element to rotate along the rotating shaft serving as a rotation central axis, and when the polarizing element is rotated, the at least one second laser beam is incident on the polarizing element, and the at least one second laser beam outputted from the polarizing element has different polarization states at different times;
- at least one light valve, disposed on a transmission path of the illumination beam to convert the illumination beam into an image beam; and
- a projection lens, disposed on a transmission path of the image beam.

* * * * *